United States Patent [19]
Hulin

[11] Patent Number: 5,518,444
[45] Date of Patent: May 21, 1996

[54] APPARATUS FOR SHELLING DRIED SHRIMP

[76] Inventor: Michael J. Hulin, 2166 Hwy. 319, Franklin, La. 70538

[21] Appl. No.: 457,021

[22] Filed: Jun. 1, 1995

[51] Int. Cl.⁶ .............................................. A22C 29/02
[52] U.S. Cl. .............................................. 452/5; 452/99
[58] Field of Search ........................... 452/5, 7, 1, 2, 452/10, 99

[56] References Cited

U.S. PATENT DOCUMENTS

| | | |
|---|---|---|
| 3,466,699 | 9/1969 | Willis et al. . |
| 3,528,125 | 9/1970 | Jones, Jr. . |
| 3,871,086 | 3/1975 | Rutledge . |
| 3,875,614 | 4/1975 | Lapeyre . |
| 4,726,095 | 2/1988 | Bissell, Jr. et al. .................. 452/99 |
| 4,763,386 | 8/1988 | Wissbroecker ...................... 452/99 |
| 4,862,794 | 9/1989 | Lapeyre et al. . |
| 5,129,855 | 7/1992 | Bruckert et al. .................... 452/99 |

FOREIGN PATENT DOCUMENTS

| | | | |
|---|---|---|---|
| 713827 | 11/1941 | Germany ............................... 452/5 |
| 18671 | of 1909 | United Kingdom ................... 452/5 |
| 9212641 | 8/1992 | WIPO .................................. 452/135 |
| 9410848 | 5/1994 | WIPO .................................. 452/135 |

*Primary Examiner*—Willis Little
*Attorney, Agent, or Firm*—William W. Stagg

[57] ABSTRACT

An apparatus for shelling dried shrimp comprising an outer container and an inner container for receiving a quantity of dried shrimp for shell removal. The inner container is positioned within the outer container so as to leave a shell collecting space between the bottom of the inner container and the bottom of the outer container. The inner container bottom has a multiplicity of holes to allow communication between the inner container and the outer container at the shell collecting space. After a quantity of dried shrimp is placed in the inner container, the shrimp is mixed and turned by a rotating blade which loosens and removes the shells from the shrimp. Suction is applied in the shell collecting space by a vacuum means which pulls the loose shells from the inner container into the shell collecting space.

20 Claims, 2 Drawing Sheets

5,518,444

APPARATUS FOR SHELLING DRIED SHRIMP

FIELD OF INVENTION

The present invention generally relates to the field of seafood processing and more particularly relates to an apparatus for removing the shells from sun dried shrimp.

BACKGROUND OF INVENTION

In the field of processing shellfish, especially shrimp, the shrimp are often sun dried for preservation. This is especially true of small and tiny shrimp that are otherwise difficult to market. To complete the processing of the shrimp after sun drying, it is necessary to remove the shells. The current methods employed for shell removal make this task difficult and time consuming. Often the end result of the shell removal process leaves the shrimp battered, broken and in pieces which significantly reduces the marketable volume of the shrimp, often as much as one-third. Thus, the price for unbroken dried shrimp is increased due to the shell removal difficulties which in turn reduces the demand. There is a need for an efficient and cost effective shell removal process for dried shrimp to allow more of the shrimp catch to remain intact after shell removal and at a reasonable cost.

Shells may be removed from small lots of dried shrimp by placing the dried shrimp in a cloth bag or sack and beating the shrimp filled sack against a hard object such as a sack or a tree. This method is time consuming and requires significant physical effort. Quantities of shrimp dust are produced as a result of the beating operation making it an unpleasant task. This method is suitable only for deshelling limited quantities of dried shrimp such as that which might be required by a sport shrimper or a very small commercial operation.

Efforts have been made to provide mechanical devices to facilitate removal of the shells. One such device employed is to provide a rotating tumbler of wooden slats and wire. The dried shrimp is placed into the tumbler which is then rotated. The shrimp pitched around in the tumbler falling against the wire and the wooden slats which dislodges the shells from the shrimp. The disadvantages of this procedure is that the shrimp is often broken, reducing the marketable volume of the shrimp as well as the appearance of the end product. In addition, the tumbling process is time consuming and their is little to no control over the shrimp dust and shells which fly everywhere and must be swept up.

Another method and apparatus for removing shells from crustacea is that described in U.S. Pat. No. 3,875,614 to Lapeyre. The Lapeyre patent describes an apparatus and method for removing shells by means of compelling the crustacea over a predetermined path having incisors for cutting the shells. The shells are then separated from the meat by flotation methods.

Another device is that described in U.S. Pat. No. 3,871,086 to Rutledge. Rutledge discloses a device for peeling hard shelled crustaceans by passing the deheaded headed crustacean through parallel cutting blades spaced apart a distance less than the body width of the crustacean.

Still another device for peeling warm pre-cooked shrimp has been described and illustrated in U.S. Pat. No. 4,862,794 to Lapeyre et al. The Lapeyre et al patent discloses a device having a peeling mechanism comprised of a series of rollers, some rubber coated and some metal, which squeeze the resilient warm shrimp to loosen and break away the shells. A disadvantage of the Lapeyre et al device is that it is best utilized when the shrimp are freshly cooked and hot and resilient.

Another device used to deshell shrimp is that disclosed in U.S. Pat. No. 3,528,125 to Jones, Jr. The Jones, Jr. patent discloses an apparatus for use on board a trawler that deshells raw shrimp by placing the shrimp through a compression conveyor and engaging the shrimp with a tined wheel which pulls the shrimp from the abraded compression action of the conveyor and thereby removing the shells.

Still another method and apparatus for deshelling cooked shrimp is illustrated in U.S. Pat. No. 3,466,699 to Willis et al. The Willis et al patent discloses a deshelling device which removes the shells from cooked shrimp by passing cooked shrimp, preferable boiled and so after boiling is completed, through a hopper and then between two vertically disposed rotating flexible discs which rotate between two horizontally disposed bars. The space between the bars is adjustable depending upon the size of the shrimp. The action of the rotating discs and the bars on the shrimp forces loose the shells. Shell removal is facilitated by continuously washing the shrimp and apparatus components with water. Washing the shrimp with water, which is required to implement the method of Willis et al, would not be suitable for peeling dried shrimp.

None of these devices disclose a process for the rapid and efficient removal of the shells from dried shrimp with a minimum of breakage. Consequently, a need exist for improvements in techniques to remove the shells from dried shrimp to minimize breakage and to eliminate the clean-up problems associated with conventional methods.

SUMMARY OF INVENTION

The present invention provides an apparatus and method designed to satisfy the aforementioned needs. The invention embodies a peeling mechanism that is simple, efficient and substantially reduces the time required to peel dried shrimp.

Accordingly, the present invention relates to an apparatus and method for peeling dried shrimp having a hopper having a plurality of vacuum holes, a rotating mixer blade, and a vacuum system for removing and collecting the shrimp shells from the hopper, which includes the steps of (a) placing the dried shrimp into the hopper; (b) mixing the shrimp with the rotating blade within the confines of the hopper; and (c) using suction means to remove the shells from the hopper for collection. The mixing step includes varying the speed and angle of the mixer blade.

DESCRIPTION OF PREFERRED EMBODIMENT

Figure 1:
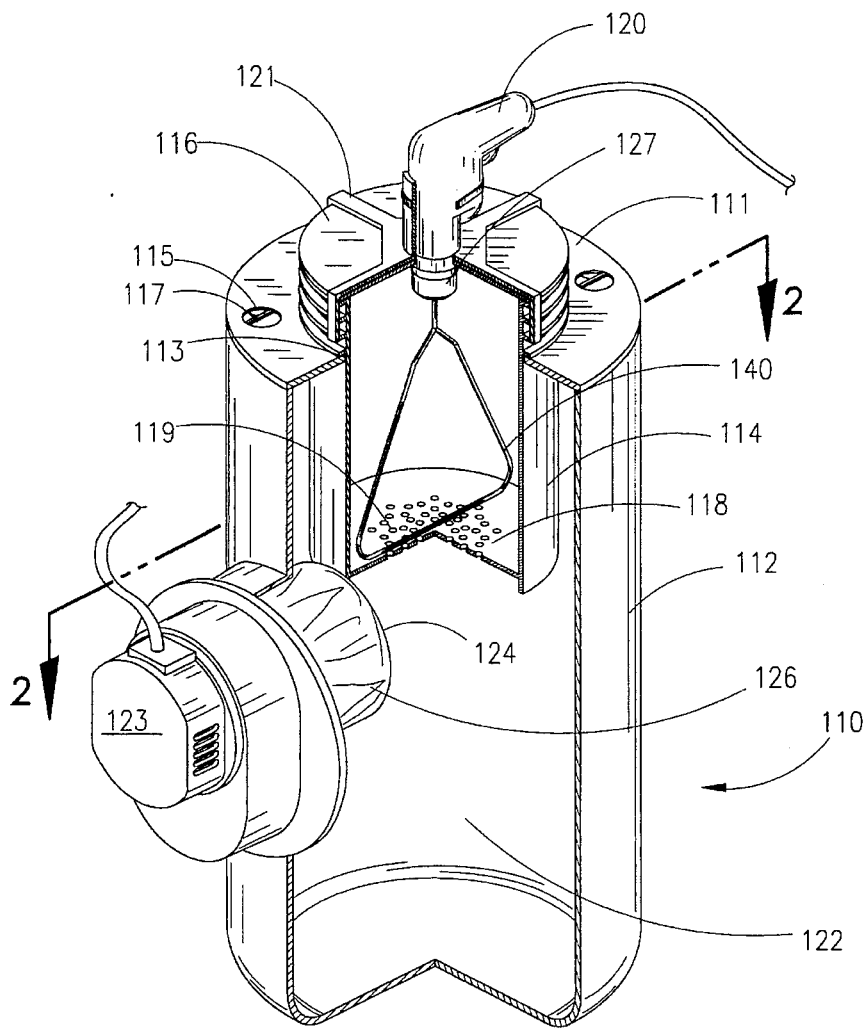
FIG. 1 is a cut-a-way perspective view of the preferred embodiment of applicant's invention.

Referring now to the drawings and more particularly to FIG. 1 there is shown the preferred embodiment of the present invention. The shelling apparatus 110 is comprised of an outer container 112 and an inner container 114. In the preferred embodiment the outer container 112 is made of a plastic fifty-five gallon drum and the smaller inner container 114 is a plastic five gallon bucket. The containers may be varied in size and shape other container materials, such as metals, may be utilized.

The outer container 112 has a cover 111 having an opening 113 sized so that the inner container 114 will fit into and be retained by the opening 113. The cover 111 of the outer container 112 also contains air openings or vents 115 having air vent covers 117 to regulate the flow of air into the inner container.

The inner container 114, which fits snugly in the cover opening 113, also has a cover 116 which is preferable made of clear plexiglass to allow visibility into the container 114. The cover 116 is reinforced by cover struts 121 which aid in supporting an electric drill 120 which is mounted to the cover. The drill 120 is use to turn a blade 140 which is attached to the bit jaw assembly 127 of the drill 120. Other types of blade turning means such as an electric motor or a small gasoline engine may be utilized in lieu of the electric drill 120.

Mounted on the side of the outer container 112 is a vacuum assembly 123. In the preferred embodiment, the vacuum system from a commercially available electric shop vacuum cleaner is thought to be sufficient. The vacuum inlet 124 of the vacuum assembly 123 is located near the bottom 118 of the inner container 114 to focus the suction pull of the vacuum in the area. A filter 126 is position over the vacuum inlet 124 to filter dust, loosened shells and other debris from the vacuum assembly.

The inner container 114 has a bottom 118 through which is drilled multiple holes 119. When the vacuum assemble 123 is activated the loose shells from the dried shrimp placed in the inner container 114 are pulled through holes 119 into the outer container 112 by the vacuum pull on the inside of the outer container 112 created by the vacuum assembly 123.

Figure 2:
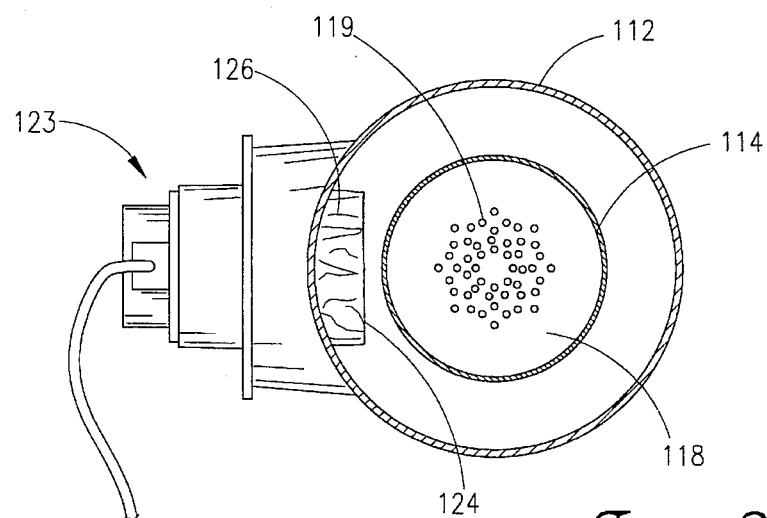
FIG. 2 is a horizontal cross-sectional view of applicant's invention.

The shells are then collected in the bottom space 122 of the outer container 112 for later removal. The holes 119 on the bottom of container 114 are sized so that they are small enough to allow the loosened shells to be pulled into the outer container 112 and large enough to retain the shrimp in the inner container 114. In the preferred embodiment, as shown in FIG. 2, the holes 119 are located around the center portion on the bottom 118 of the smaller inner container 114 away from the container edges.

Figure 3:
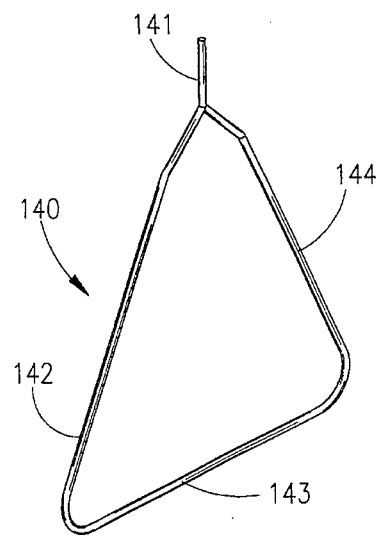
FIG. 3 is an elevational view of the preferred mixing blade.

The blade 140 is shown in FIG. 3. The blade 140, used to mix and turn the unshelled dried shrimp placed in container 114, has a shaft 141 for engagement with the jaw assembly 127 of the drill 120. The blade 140 transitions from the shaft segment 141 to a triangular shape having a first essentially vertical wing segment 142 which curves to an essentially horizontal base segment 143 and a second essentially vertical wing segment 144 ending back at the shaft segment 141. The blade 140 as described being formed of stiff wire, such as coat hanger wire, or a metal rod and configured to form an isosceles triangle having sides 142 and 144 and base 143. It is thought that this blade configuration is more efficient in removing the shells. However, other configurations may be utilized without departing from the intent of this invention.

Figure 4:
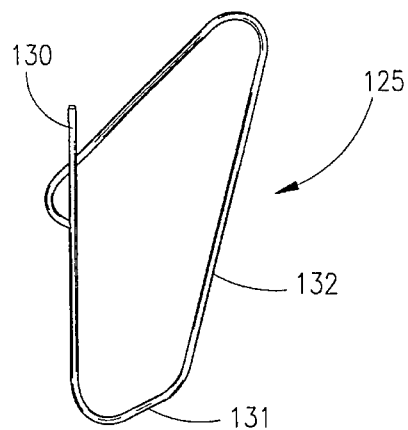
FIG. 4 is an elevational view of an alternate mixing blade.

One such blade configuration is that alternate embodiment of the mixing blade that is shown in FIG. 4. The blade 125 may also be used to mix and turn the unshelled dried shrimp placed in the container 114. Mixing and turning the unshelled shrimp with the blade 125 in the confines of the container 114 loosens and breaks away the shell from the dried shrimp. Blade 125 is comprised of bent metal wire or thin rod having a vertical shaft segment 130 which is held in the jaw assembly 127 of the drill 120. The vertical shaft 130 extends out from the drill, curves to a lower essentially horizontal segment 131, curves back up vertically to form a wing segment 132, and finally curves or loops back down and over to the shaft segment 130.

To use the preferred embodiment of the dried shrimp shelling apparatus, a quantity of dried shrimp is placed in the inner container 114. The plexiglass cover 116 of the inner container to which is mounted the electric drill 120 with the blade 140 is then placed over the inner container. The dried shrimp are then mixed and turned within the inner container 114 by the rotating blade 140 to loosen and remove the shells.

During the mixing and turning, the electric vacuum assembly 123 is turned on to provide suction below the bottom 118 of the inner container 114 and through the holes 119. This suction pulls the loosened shells through the holes 119 where they are collected in the bottom space section 122 of the outer container 112 for later removal. The suction thus removes the shells and dust from the inner container 114 leaving only the deshelled shrimp.

Figure 5:
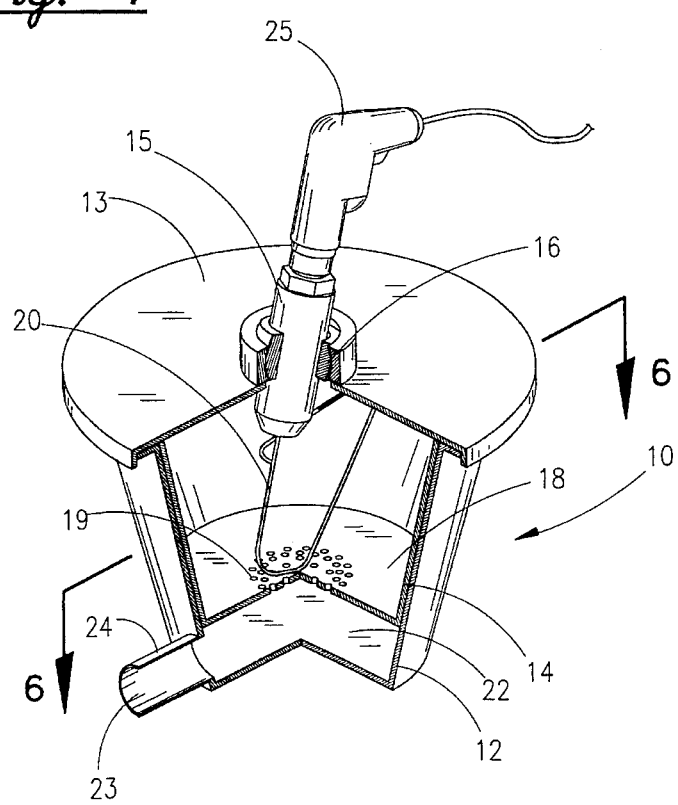
FIG. 5 is a cut-a-way perspective view of an alternate embodiment of applicants invention.
Figure 6:
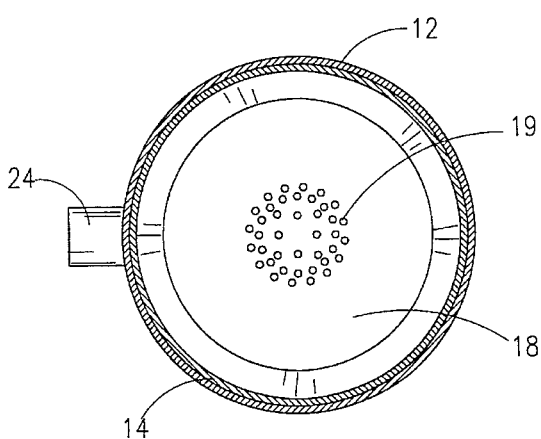
FIG. 6 is a horizontal cross-sectional view of the invention in FIG. 5.

FIGS. 5 and 6 show an alternative embodiment of the invention which may be use for shelling on a smaller scale. The alternate embodiment 10 is comprised of outer container 12 in which is inserted a smaller inner container 14. The inner container 14 has a bottom 18 having multiple holes 19 in a circular configuration around the center portion of the container bottom 18. The inner container 14 and the outer container 12 are configured so as to allow a shell collection space 22 below the bottom 18 of the inner container 14 when the inner container 14 is inserted in the outer container 12. The outer container 12 has a port 23 in communication with the shell collection space 22. A flange 24 is mounted on the outside of the outer container 12 for connecting a vacuum hose from a shop vacuum (not shown).

The outer container has a removable clear plexiglass cover 13 through which is mounted a pivotable drill stem 15 by means of a bearing 16. The drill stem has a thread segment on its lower end for attachment of a blade 20 and a stud at its upper end for attachment to an electric drill 25. The blade 20 is shaped in a configuration corresponding to that described for blade 125 shown in Figure A, though other blade shapes may be utilized.

To use this alternative embodiment, a shop vacuum suction hose is connected to the vacuum flange 24. A quantity of dried shrimp is placed into the inner container 14 and the cover 13 having drill 25 with blade 20 attached is placed over both the inner and the outer containers. The drill is turned on rotating the blade 20 to mix and turn the dried shrimp to loosen and remove the shells. The drill stem 15 and bearing 16 allow the blade 20 to be pivoted in all directions around the inside of the container 14. The suction created in the shell collection space 22 from the vacuum, pulls the shells through the holes 19 in the bottom 18 of the container 14 leaving the deshelled shrimp in the container.

It is thought that the apparatus described herein can be utilized for shelling other shellfish such as prawns, crayfish, scampi and the like. It is thought that the shrimp shelling apparatus and method of the present invention and many of its attendant advantages will be understood from the foregoing description and it will be apparent that various changes may be make in the form, construction and arrangement of the parts thereof without departing from the spirit and scope of the invention or sacrificing all of its material advantages, the form described herein being merely a preferred or exemplary embodiment of the invention.

I claim:

1. An apparatus for shelling dried shellfish comprising:
    a) an outer container having a top, sides and a bottom;
    b) an inner container having a top, sides and a bottom for receiving a quantity of said shellfish, said inner container being positioned within said outer container so as to leave a space between said bottom of said inner container and said bottom of said outer container, said inner container bottom having a multiplicity of holes;
    c) vacuum means mounted to said container for applying suction in said space between said bottom of said inner container and said bottom of said outer container;
    d) a blade protruding into said inner container for mixing and turning said shellfish; and
    e) means mounted to said inner container top for turning said blade.

2. An apparatus for shelling dried shellfish as recited in claim 1, wherein said vacuum means includes an electric vacuum mounted to said outer container.

3. An apparatus for shelling dried shellfish as recited in claim 2, wherein said vacuum means includes connecting the suction hose of an electric vacuum cleaner to a flange mounted on said outer container.

4. An apparatus for shelling dried shellfish as recited in claim 2, wherein said means for rotating said blade includes an electric drill.

5. An apparatus for shelling dried shellfish as recited in claim 1, wherein said plurality of holes in said bottom of said inner container are positioned around the center of said inner container bottom away from its sides.

6. An apparatus for shelling dried shellfish as recited in claim 1, wherein said blade includes a stiff wire having a downwardly essentially vertical shaft portion, an essentially horizontal lower portion, an upwardly essentially vertical wing portion, and a downward looped portion connecting to said shaft portion.

7. An apparatus for shelling dried shellfish as recited in claim 1, wherein said blade includes a stiff wire, said wire being configured to form an isosceles triangle having a equilateral side portions and a horizontal base portion.

8. An apparatus for shelling dried shellfish as recited in claim 1, wherein said outer container is a barrel and said inner container is a bucket.

9. An apparatus for shelling dried shellfish as recited in claim 8, wherein said barrel and said bucket are plastic.

10. An apparatus for shelling dried shrimp comprising:
    (a) an outer container having a top, a bottom and sides;
    (b) an inner container having a removable top, bottom and sides, said inner container bottom having a plurality of holes;
    (c) means for mounting said inner container on the top of said outer container whereby said bottom of said inner container penetrates said top of said outer container so that said bottom of said inner container is positioned within said outer container;
    (d) a vacuum means mounted to said outer container at its side whereby said vacuum means produces a suction within said outer container at said bottom of said inner container;
    (e) a blade means mounted to said top of said inner container whereby said blade means protrudes into said inner container when said inner container top is in place on said inner container;
    (f) a bearing means for pivoting said blade within said inner container;
    (g) a means for rotating said blade within said container; and
    (h) means for accessing said outer container to remove said shrimp shells.

11. An apparatus as recited in claim 10 wherein said top of said inner container is made of a transparent material.

12. An apparatus as recited in claim 10 wherein said vacuum means is an electric shop vacuum.

13. An apparatus as recited in claim 10 wherein said means for rotating said blade is an electric drill.

14. An apparatus for shelling dried shrimp as recited in claim 10, wherein said plurality of holes in said bottom of said inner container are positioned around the center of said inner container bottom away from said inner container sides.

15. An apparatus for shelling dried shrimp as recited in claim 10, wherein said blade includes a stiff wire having a downwardly essentially vertical shaft portion, an essentially horizontal lower portion, an upwardly essentially vertical wing portion, and a downward looped portion connecting to said shaft portion.

16. An apparatus for shelling dried shrimp as recited in claim 10, wherein said blade includes a stiff wire, said wire being configured to form an isosceles triangle having a equilateral side portions and a horizontal base portion.

17. An apparatus for shelling dried shrimp as recited in claim 1, wherein said outer container is a barrel and said inner container is a bucket.

18. An apparatus for shelling dried shrimp as recited in claim 8, wherein said inner container and said outer container are made of plastic.

19. A method for removing the shells from dried shellfish such as shrimp comprising the steps of:
    (a) providing an outer container having a top, bottom and sides;
    (b) providing an inner container having a top, bottom and sides, said inner container having a plurality of holes penetrating said inner container bottom;
    (c) providing a rotating blade means within said inner container;
    (d) positioning said inner container within said outer container;
    (e) providing a means to apply suction within said outer container at the bottom of said inner container;
    (f) placing a quantity of said dried shellfish into said inner container;
    (g) rotating said blade means so as to mix and turn said quantity of dried shellfish;
    (h) applying suction to said within said outer container so as to pull said shells from said dried shellfish through said inner container bottom holes into said outer container.

20. A method for removing the shells from dried shrimp comprising the steps of:
    (a) placing a quantity of said dried shrimp into a hopper having a plurality of suction holes;
    (b) mixing said shrimp with a rotating blade whereby removing said shells from said shrimp;
    (c) applying suction to said hopper whereby pulling said shells from said hopper through said suction holes; and
    (d) collecting said shells for disposal.

* * * * *